United States Patent [19]

Sasaki et al.

[11] Patent Number: 4,633,346

[45] Date of Patent: Dec. 30, 1986

[54] MAGNETIC HEAD POSITIONING DEVICE FOR A FLEXIBLE DISK

[75] Inventors: Masaru Sasaki, Kanagawa; Shin Isozaki, Kamakura, both of Japan

[73] Assignee: Mitsubishi Denki Kabushiki Kaisha, Tokyo, Japan

[21] Appl. No.: 746,404

[22] Filed: Jun. 19, 1985

[30] Foreign Application Priority Data

Jun. 20, 1984 [JP] Japan .................... 59-126896

[51] Int. Cl.⁴ ............................. G11B 21/08
[52] U.S. Cl. ............................. 360/78; 360/75; 318/685; 318/696
[58] Field of Search .......... 360/69, 75, 78, 77, 360/105, 106, 97–99, 86; 318/640, 685, 696; 250/574

[56] References Cited

U.S. PATENT DOCUMENTS 4,325,016  4/1982  Takeuchi .................... 318/640

FOREIGN PATENT DOCUMENTS 0055353  7/1982  European Pat. Off. .
0126371  11/1984  European Pat. Off. .......... 360/75
2340978  2/1975  Fed. Rep. of Germany .

OTHER PUBLICATIONS

IBM TDB vol. 24, No. 7A "Head Loader Control Circuit" Hanley, 12/81, pp. 3162–3163.

*Primary Examiner*—Aristotelis M. Psitos
*Assistant Examiner*—Steven R. Garland
*Attorney, Agent, or Firm*—Oblon, Fisher, Spivak, McClelland, & Maier

[57] ABSTRACT

A bead positioning apparatus includes a carriage for moving a magnetic head to a specified position of data tracks in a storage medium, a motor for driving the carriage depending on excitation pulses from a step motor, a light shielding plate mounted on the carriage, a light-emitting element, a light-sensitive element opposing to the light-emitting element through the light shielding plate and a position-judging device for judging the position of the magnetic head depending on the excitation pulses of the step motor and a signal of the light-sensitive element generated when light is shielded by the light-shielding plate, wherein the light-emitting element and the light-sensitive element are connected to a power source through a common switching element and the position-judging device outputs a signal, when the switching element is turned off, which is the same signal as if the light-sensitive element were device sensing light. The switching element being turned off represents a stand-by mode which is a power saving feature.

5 Claims, 8 Drawing Figures

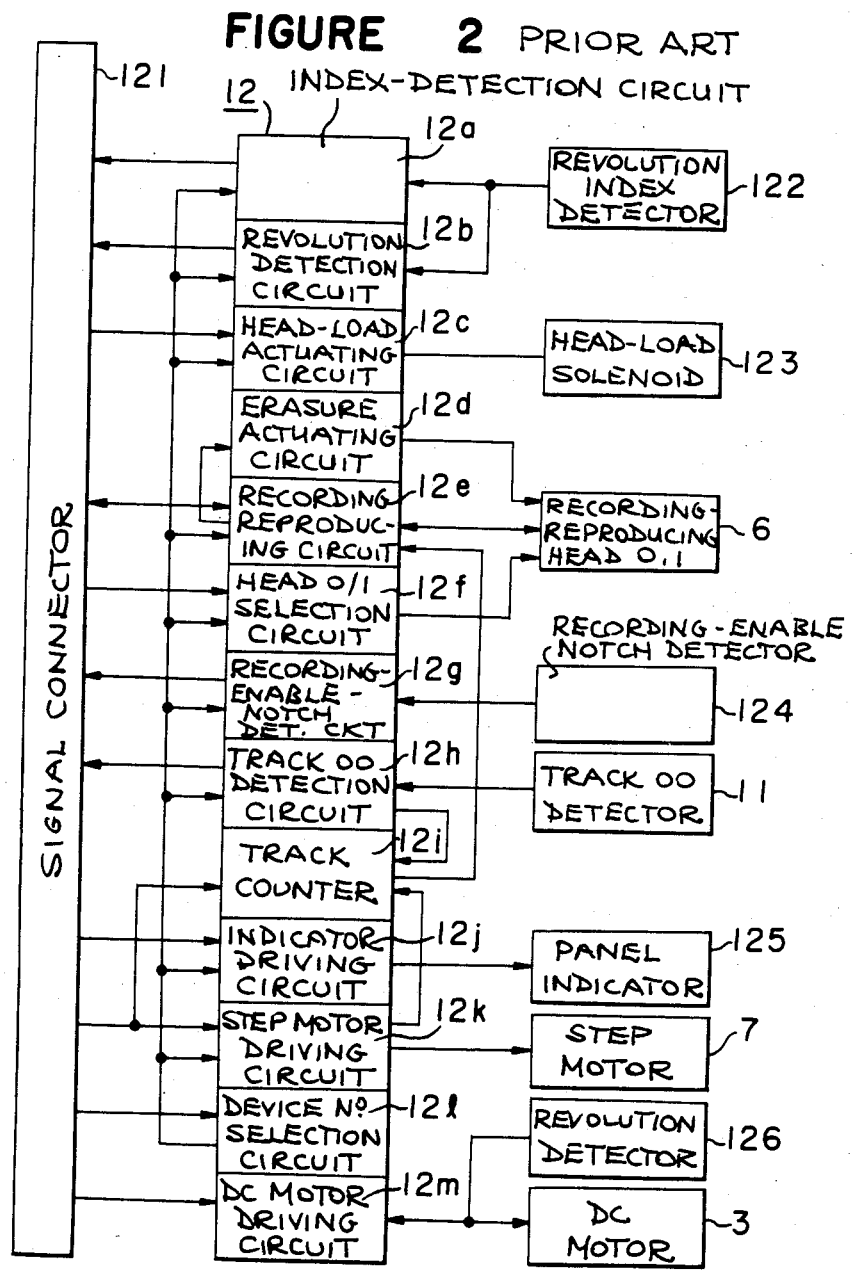

MAGNETIC HEAD POSITIONING DEVICE FOR A FLEXIBLE DISK

BACKGROUND OF THE INVENTION

1. Field of the Invention

The present invention relates to a flexible disk apparatus. More particularly, it relates to a magnetic head positioning device in the flexible disk apparatus to save energy in stand-by condition of the apparatus.

2. Discussion of Background

FIG. 1 is a diagram showing an essential part of the head position determining device of a conventional flexible disk apparatus. In FIG. 1, a reference numeral 1 designates a flexible disk as a storage medium having coaxially formed data tracks for recording and reproducing data. The flexible disk held in a jacket 2 is attachable to and detachable from the flexible disk apparatus. A spindle motor 3 is provided to rotate the flexible disk 1 supported by a hub 4. A carriage 5 having a magnetic head 6 at its one end is driven by a step motor 7 through a metallic belt 8 to be moved in the radial direction of the flexible disk 1 by the aid of guiding rods 9 so that the magnetic head 6 is brought to a predetermined position in the data tracks of the flexible disk 1. A reference numeral 11 designates a track 00 sensor which detects a condition that the magnetic head 6 is at a home position in the outermost circumference of the tracks in the flexible disk 1, i.e. at a track 00 position. The track 00 sensor is constituted by a light-emitting diode 11a as a light-emitting element and a semiconductor photosensor 11b as a light-sensitive element which are adapted to face each other through the light-shielding plate when the magnetic head is brought to the track 00 position. An electric circuit 12 includes a position-judging means for judging the positon of the head 6 depending on a signal A from the track 00 sensor 11 and a step-motor excitation-pulses B applied to the step motor 7 and is connected to the above-mentioned elements.

FIG. 2 shows connection between the electric circuit 12 and the magnetic head 6, the sensor 11 and other elements. The electric circuit 12 includes an index-detection circuit 12a, a revolution-detection circuit 12b, a head-load actuating circuit 12c, an erasure actuating circuit 12d, a recording-reproducing circuit 12e, a head 0/1 selection circuit 12f, a recording-enable-notch detecting circuit 12g, a track 00 detection circuit 12h, a track counter 12i, an indicator driving circuit 12j, a step motor driving circuit 12k, a device number selection circuit 12l, a DC motor driving circuit 12m and so on. In FIG. 2, a numeral 121 designates a signal connector, a numeral 122 a revolution index detector, a numeral 123 a head-load solenoid, a numeral 124 a recording-enable-notch detector, a numeral 125 a panel indicator and a numeral 126 a revolution speed detector.

FIGS. 3a and 3b conventional circuits of the track 00 sensor 11 and a position-judging means of the electric cirucit 12.

In FIG. 3a, the light-emitting diode 11a is disposed facing the semiconductor photosensor 11b, each of which is connected to a power source through a resistor Rd or a resistor Rs. The cathode side of the diode or the photosensor is grounded. In this case, the light-emitting diode 11a is lit. If the light-shielding plate is not interposed between the semiconductor devices, the semiconductor photosensor 11b is turned on, whereby potential at the anode side becomes an earth level to generate an L level signal A. This fact represents that the magnetic head 6 is not at the track 00 position.

On the other hand, when the light-shielding plate 10 is between the light-emitting diode 11a and the semiconductor photosensor 11b to interrupt light, the semiconductor photosensor 11b is turned off to thereby generate an H level signal A from the anode side. This fact indicates that the carriage 5 is brought to the home position and the head 6 is at a position near the track 00 position of the substantially outermost circumference of the tracks. However, the distance between the adjacent tracks of the flexible disk 1 is extremely small as about 0.26 mm in the case of 5.25 inches, 96 tracks/inch type flexible disk and about 0.19 mm in the case of 3.5 inches, 135 tracks/inch type flexible disk. Accordingly, it is difficult to discriminate in high accuracy each track depending on the signal A from the semi-conductor photosensor 11b. In the conventional apparatus, therefore, judgement of the head 6 at the track 00 position is made when there is coincidence of the signal A of the semiconductor photosensor 11b and an excitation phase as a specified phase, e.g. PHASE 0 of the step-motor excitation-pulses B applied to the step motor 7. In FIG. 3a, there is provided an AND circuit 13 as the position-judging means for judging the position of the head 6. When the head 6 is brought to the track 00 position, a track 00 signal C is generated from the output side of the AND circuit. The excitation phase of the step motor 7 generally assumes the same phase position at every four steps, namely, each time the head 6 moves four tracks, and the head is stepwisely forwarded in the same direction repeatedly in a manner of PHASE 0, 1, 2, 3, 0, 1, 2, 3, 0. Accordingly, when the signal A of the semi-conductor photosensor 11b is generated, judgement is made as to the head 6 being moved near the track 00 position, and the track 00 signal C having an H level is obtainable by detecting through the AND circuit 13 coincidence of the signal A and the excitation phase (PHASE 0) of the step motor 7, whereby the position of the head 6 at the track 00 can be correctly indicated.

FIG. 3b is a circuit diagram showing another conventional device. In the conventional device, in order to increase sensitivity of detection of the movement of the light-shielding plate 10 attached to the carriage 5, a resistor Rs is inserted between the semiconductor photosensor 11b and earth to take out the signal A from the cathode side and the signal A is input into the AND circuit 13 through an inversion and amplification circuit 14.

There have been known to use one or more than two flexible disk apparatuses of this kind as external memory devices of a small capacity computer. In this case, if a power source is disconnected from the spindle motor 3, the step motor 7 and elements in the electric circuit 12 which are not used in the stand-by condition of the apparatus, power is saved in the entire system. Particularly, the saving of power is an essential problem in a portable type computer to be operated by batteries. However, when a power source is disconnected in the conventional device to perform saving of power, a problem arises on the light-emitting diode 11a although there is no problem concerning the spindle motor 3, the step motor 7 and so on. Namely, when the power source for the light-emitting diode 11a is disconnected, there takes place the same effect as interruption of light by the light-shielding plate 10, whereby the track 00 signal C of the AND circuit 13 becomes an H level at the excitation phase (PHASE 0) at every four tracks in the step-motor excitation-pulses B. This causes misleading indication that the head 6 is at the track 00 position.

On the other hand, the flexible disk apparatus is provided with a track counter (not shown) for the purpose of changing recording current and other purposes. The track counter is reset when the track 00 signal C having the H level is detected, and thereafter, the track counter counts seek-step input pulses in the inner or outer radial direction of the flexible disk 1 to know the present position of the head 6. Accordingly, when a misled track 00 signal C is generated, the track counter is reset during counting operation. As a result, the data of the track counter becomes incorrect and the normal operation of the apparatus can not be expected. Further, if a misleading signal on the track 00 position leaks during receiving of a device selection signal, there may takes place error in the computer.

Thus, the conventional apparatus is hindered to disconnect the light-emitting diode 11a from the power source as the spindle motor 3 and step motor 7, with the result of difficulty in saving energy during stand-by condition of the apparatus. A current to be passed in the light-emitting diode 11a is 20 mA or so, which is not negligible as a power produced during the stand-by condition of the apparatus because current to be passed to other logical circuits such as CMOS circuit, CMOS-LSI etc. can be extremely small.

SUMMARY OF THE INVENTION

It is an object of the present invention to provide a flexible disk apparatus effective to save power.

The foregoing and the other objects of the present invention have been attained by providing a flexible disk apparatus comprising a carriage for moving a magnetic head to a specified position of data tracks in a storage medium, a motor for driving the carriage depending on excitation pulses from a step motor, a light shielding plate mounted on the carriage, a light-emitting element, a light-sensitive element opposing to the light-emitting element through the light-shielding plate and a position-judging means for judging the position of the magnetic head depending on the excitation pulses of the step motor and a signal of the light-sensitive element generated when light is shielded by the light-shielding plate, wherein the light-emitting element and the light-sensitive element are connected to a power source through a common switching element and the position-judging means outputs a signal, when the switching element is turned off, which is the same signal as if the light-sensitive element where sensing light.

BRIEF DESCRIPTION OF THE DRAWINGS

FIG. 2 is a circuit diagram of the conventional flexible disk apparatus;

DETAILED DESCRIPTION OF THE PREFERRED EMBODIMENTS

Figure 1:
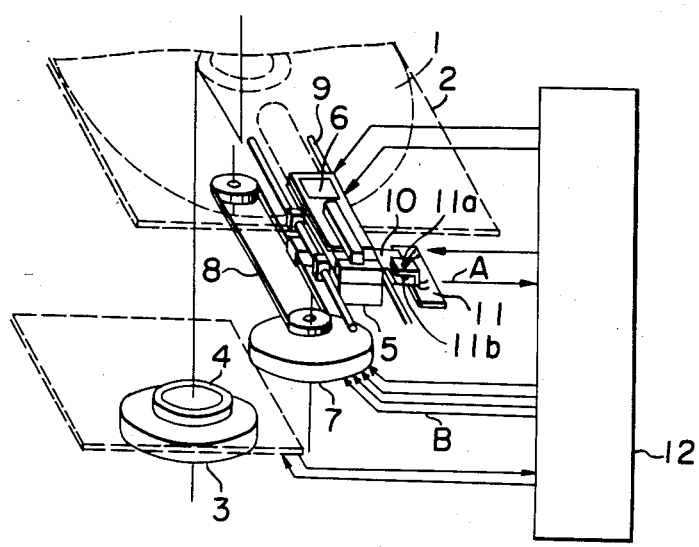
FIG. 1 is a diagram showing a head position determining device of a conventional flexible disk apparatus.
Figure 3:
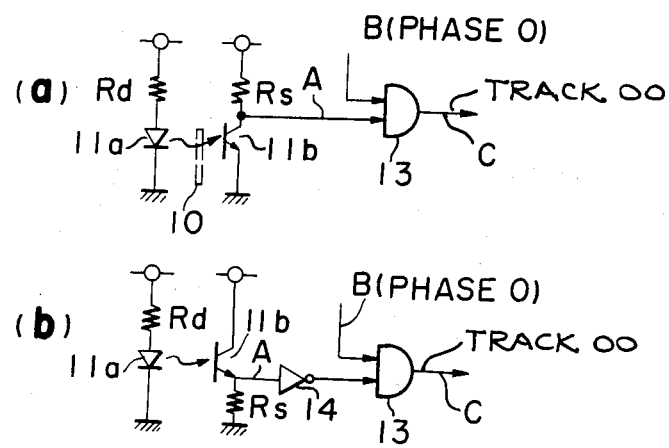
FIG. 3a and FIG. 3b are respectively circuit diagrams of the conventional magnetic head position determining devices.

Preferred embodiments of the present invention will be described with reference to FIGS. 4 to 7. In the Figures, the same reference numerals designate the same or corresponding parts and therefore, description of these parts is omitted.

Figure 4:
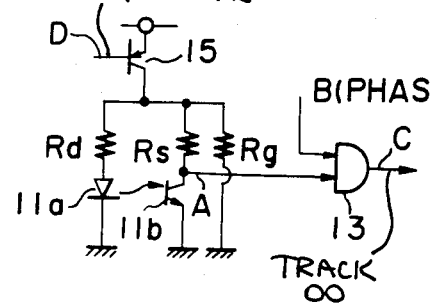
FIGS. 4 to 7 respectively circuit diagrams of the first to the fourth embodiment of the magnetic head position determining devices according to the present invention.

FIG. 4 shows the first embodiment of the present invention. A PNP junction transistor 15 as a common switching element is provided between a power source and the light-emitting diode 11a and the semiconductor photosensor 11b. The emitter of the transistor 15 is connected to the power source and the collector is connected to the light-emitting diode 11a and the semiconductor photosensor 11b. The base of the transistor 15 receives a signal D which is in an H level in the stand-by condition of the apparatus. The H level signal D turns off the transistor 15, and the light-emitting diode 11a and the semiconductor photosensor 11a are disconnected from the power source, whereby the signal A from the photosensor 11b becomes an L level. Accordingly, a track 00 signal C having an L Z5 level is generated from the AND circuit 13 irrespective of the phase of the step-motor excitation-pulses B. In this embodiment, a resistor Rg with one end grounded is connected to the collector side of the transistor 15 so that a potential at the side of anode of the semiconductor photosensor 11b instantaneously becomes the earth level (L level) at the time of interruption of the power source.

Figure 5:
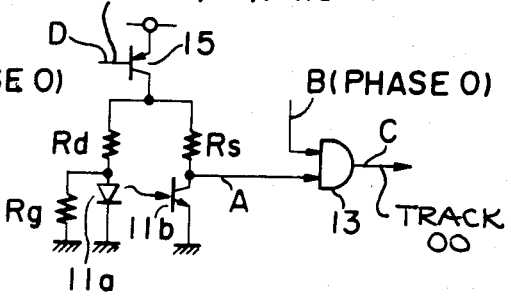

In the second embodiment shown in FIG. 5, the same resistor Rg as used in the first embodiment is provided in parallel to the light-emitting diode 11a to reduce a needless current passing in the resistor Rg in the operation of the light-emitting diode 11a. The current flowing in the resistor Rg is small since the voltage across both ends of the light-emitting diode 11a in the operation is small. In this case, the value of Rs+Rd+Rg can be lower than an impedance necessary to keep the input of the AND circuit 13 in the L level; however, a resistor having a sufficiently large resistance may be used when a CMOS type device is used as the AND circuit 13.

Figure 6:
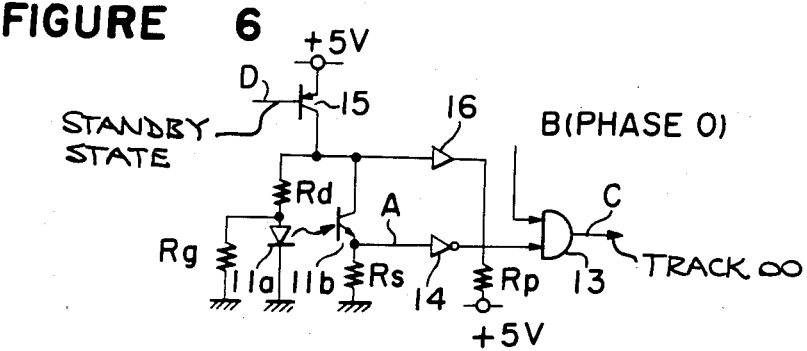

FIG. 6 shows the third embodiment of the present invention. In this embodiment, an inversion and amplification circuit 14 as used in the conventional device is connected to the output side of the semiconductor photosensor 11b. With the insertion of the circuit 14, a signal of the H level is provided to the AND circuit by means of the inversion and amplification circuit 14 even though the signal A becomes L level by the interruption of the power source for the semiconductor photosensor 11b. Accordingly, in this embodiment, a non-inversion and amplification device 16 is connected between the collector side of the transistor 15 and the output side of the inversion and amplification circuit 14, and a power source is connected to the output side of the non-inversion and amplification circuit 14 through a resistor Rp to apply a voltage of +5 V to the output of the amplification circuit 14. Accordingly, even though the output of the inversion and amplification circuit 14 becomes H level, an input to the AND circuit 13 at the time of interruption of power source is always in L level. In this embodiment, an open collector IC is used for each of the amplification circuits 14, 16.

Figure 7:
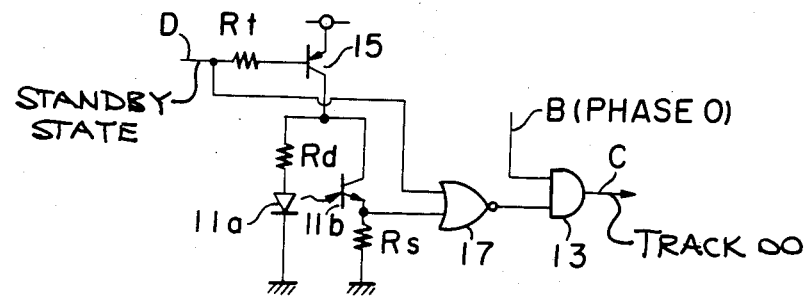

In the fourth embodiment shown in FIG. 7, an NOR circuit 17 is used instead of the non-inversion and amplification circuit 14 as in the third embodiment, and a resistor Rt is connected to the base side of the transistor 15, whereby a signal D having H level is obtained at the time of interruption of the power source. In this embodiment, it is more effective way to use CMOS device for the AND circuit 13, the NOR circuit 17 and other components.

In accordance with the present invention, a light-emitting element and a light-sensitive element are connected to a power source through a common switching element. Accordingly the same output as in the light receiving condition of the light-sensitive element can be given to the position-judging means when the switching element is turned off. Further, various elements can be disconnected from the power source without causing any trouble during stand-by condition of reading-out and writing-in operation of the apparatus. The flexible disk apparatus of the present invention largely contributes to save electric power.

We claim:

1. A head positioning apparatus comprising a carriage for moving a magnetic head to a specified position of data tracks in a storage medium, a means for producing excitation pulses, a step motor means for driving said carriage in response to said excitation pulses, a light shielding plate mounted on said carriage, a light-emitting element, a light-sensitive element opposing two said light-emitting element through said light shielding plate and a position-judging means for judging the position of said magnetic head depending on said excitation pulses of the step motor and a signal of said light-sensitive element generated when light is shielded by said light-shielding plate, said head positioning apparatus characterized in that said light-emitting element and said light-sensitive element are connected to a power source through a common switching element and the position-judging means output a signal, when said switching element is turned off, which is the same signal as if said light-sensitive element were sensing light.

2. The head positioning apparatus according to claim 1, wherein said switching element is a PNP junction transistor.

3. The head positioning apparatus according to claim 1, wherein a resistor is connected in parallel to said light-emitting element.

4. The head positioning apparatus according to claim 1, wherein an inversion and amplification circuit is inserted at the output side of said light-sensitive element.

5. The heat positioning apparatus according to claim 1, wherein an NOR circuit is inserted at the output side of said light-sensitive element.

* * * * *